Patented June 24, 1947

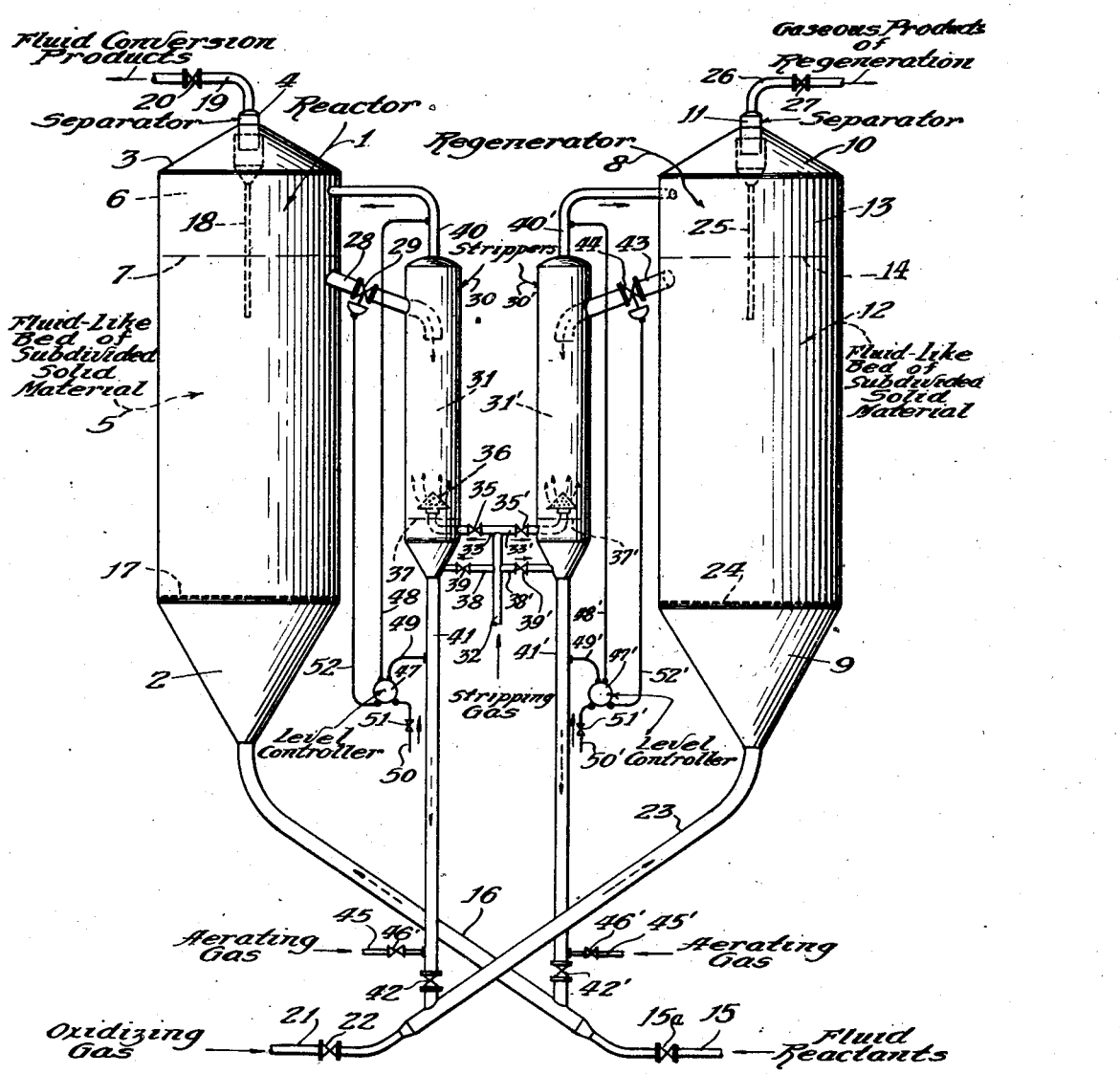

2,422,793

UNITED STATES PATENT OFFICE 2,422,793

CONVERSION OF FLUID HYDROCARBONS

Jerry McAfee, Riverside, Ill., assignor to Universal Oil Products Company, Chicago, Ill., a corporation of Delaware Application February 18, 1944, Serial No. 522,866

6 Claims. (Cl. 196—52)

The invention relates to an improved process and apparatus for the conversion or treatment of fluid reactants, such as hydrocarbons, in the presence of a mass of subdivided solid contact material or catalyst upon which deleterious combustible products of the conversion reaction or treating operation are accumulated and which is regenerated to remove the combustible contaminants.

The process is of the general type known as "fluid bed" operation employing separate reaction and regenerating vessels through which the subdivided solid catalyst or contact material is circulated in series, so as to permit continuous operation of the process and transfer heat evolved in the exothermic regenerating step to the endothermic reaction step through the medium of the circulating solid particles. A fluid-like bed of the subdivided solid material is maintained within the reaction zone and the hydrocarbons or other fluid reactants and resulting fluid conversion products are passed upwardly through the bed at a velocity regulated to partially counteract the force of gravity on the solid particles and retain the bed in a fluid-like condition of relatively high density and high solid particle concentration. A similar relatively dense fluid-like bed is maintained in the regenerating zone by passing air or other oxidizing gas employed for burning combustibles from the solid particles upwardly through the bed, with resulting combustion gases, at the required velocity for the desired fluidization of the bed.

One of the problems encountered in operation in the general type above outlined is that of stripping the stream of solid particles withdrawn from the reaction zone of occluded and adsorbed volatile combustibles prior to its introduction into the reaction zone and stripping the stream of solid particles withdrawn from the regenerating zone of oxidizing gas and combustion gases prior to its introduction into the reaction zone.

In the conversion of hydrocarbons by such processes as catalytic cracking, dehydrogenation, aromatization and the like, a considerable quantity of light hydrocarbons, including gases and low boiling liquid fractions, is occluded in the stream of subdivided solid particles withdrawn from the fluid-like bed in the reaction zone for transfer to the regenerating zone, and in many instances such materials are also adsorbed on the particles of relatively porous catalysts or contact material employed. The transfer of such light hydrocarbons to the regenerating zone materially increases the quantity of combustibles which must be burned therein, increasing the quantity of heat developed in the regenerating step and increasing the loss of valuable light hydrocarbons as a result of their being consumed by burning in the regenerator. Also the combustion of these light hydrocarbons in the regenerating zone results in the production of large quantities of steam, which in many operations is deleterious to the activity of the catalyst when contacted therewith under the conditions of oxidation and high temperature encountered in this zone. Thus, the quantity of light hydrocarbons which can be removed from the stream of solid particles being transferred from the reactor to the regenerator and recovered, represents a corresponding saving of the latter, a corresponding reduction in the required size by the regenerating equipment, and a corresponding reduction in the oxidizing gas requirement, and may also materially lengthen the useful life of the catalyst.

The substantial removal of occluded and adsorbed oxidizing gas and gaseous products of combustion from the stream of solid particles being transferred from the regenerating step to the reaction step is also of importance. The transfer of oxidizing gas from the generator to the reactor will result in the formation of undesirable oxidation products in the latter. Furthermore, gaseous products of combustion transferred from the regenerator to the reactor, or formed in the latter as a result of oxidation of the hydrocarbons, complicates the problem of efficiently separating the desirable light hydrocarbon products of the conversion reaction from the combustion gases, and increases the required size of the gas concentrating and separating equipment.

It is the purpose of the present invention to provide an improved process and apparatus of the type above outlined, in which thorough and efficient stripping of the stream of solid particles being transferred from the reactor to the regenerator and the stream of solid particles being transferred from the regenerator to the reactor is accomplished in a novel and advantageous manner. It is a further object of the invention to provide a more efficient stripping arrangement which is readily adapted, with a minimum of expense, to the many fluid bed type catalytic cracking units now in existence or under construction and which do not provide adequate facilities for efficient stripping.

I am aware that various schemes have been previously proposed for effecting the stripping of undesirable occluded and adsorbed volatiles from the catalyst being transferred between the reaction and regenerating steps in fluid bed operations. However, to my knowledge, none of these schemes has successfully accomplished the desired results and I believe the novel method and means of stripping herein provided is superior in design and performance to any of the methods and means previously proposed with which I am familiar. It is difficult to determine a degree or efficiency of stripping with respect to the catalyst being transferred from the reactor to the regenerator in existing commercial operations. Of course, inefficient stripping results in greater loss of charging stock which is usually reported as "catalyst coke" or "carbon deposit" but there is no very good basis for comparing the various reported "catalyst coke" figures which will eliminate the effect of other variables in the operating conditions employed. However, a direct indication of the degree to which catalyst being transferred from the regenerator to the reactor is stripped of combustion gases is available by analysis of the hydrocarbon gases withdrawn from the reactor. It is noteworthy that, in a large catalytic cracking installation of the most recent commercial design, a determination of the percentage of inert components in the gases from the gas recovery equipment indicates that approximately 0.025 cubic feet of such material is present in the gaseous products leaving the reactor per cubic feet of catalyst circulated between the reactor and regenerator. Although provision is made in this unit for passing large quantities of steam as a stripping fluid countercurrent to a relatively dense column of catalyst particles withdrawn from the fluid bed in the regenerator before the catalyst is transferred to the reactor, the inefficiency of this method of stripping is evidenced by the gas analysis above mentioned. In this installation the inert gases leaving the hydrocarbon gas recovery equipment amounted to between 1½ and 2 million cubic feet per day.

In the process provided by the invention, a stream of solid contact material to be transferred from one confined contacting zone to the other is directed from the upper portion of the fluid-like bed in the one zone to a separate confined stripping zone wherethrough the solid particles are caused to fall or rain downwardly countercurrent to an ascending stream of stripping gas supplied to the lower portion of the stripping zone. The resulting stripping gas and deleterious volatiles thus stripped from the solid particles (combustion gases and oxidizing gas, in the case of the solid particles passing from the regenerator to the reactor, and low boiling vaporous and gaseous hydrocarbons in the case of solid particles being transferred from the reactor to the regenerator) are removed from the upper portion of the stripping zone and preferably commingled with the outgoing stream of vaporous or gaseous products leaving the contact zone from which said stream of solid particles is withdrawn. The resulting substantially stripped solid particles are collected and directed downwardly from the stripping zone in the form of a relatively dense flowing column into a stream of transporting fluid in which they are suspended. The resulting suspension of solid particles and transporting fluid is then directed into the other confined contacting zone.

In the case of a solid contact material being transferred from the reactor to regenerator of a fluid bed system, the transporting fluid with which substantially stripped solid particles from the reactor are commingled preferably comprises all or a portion of the oxidizing gas employed for effecting the regeneration of the solid particles in the regenerating zone, and transportation of the solid particles into the regenerating zone is effected largely by the gas lift action of the oxidizing gas as will be subsequently explained in greater detail.

In the case of solid particles being transferred from the regenerator to the reactor of a fluid-bed type system, the transporting fluid with which the substantially stripped solid particles from the stripping zone are commingled preferably comprise all or a portion of the fluid reactants to be converted in the reaction zone and their transportation to the reaction zone is effected largely by the gas lift action of these fluid reactants, which may be supplied to the transfer line in an essentially vaporous or gaseous state may be supplied thereto entirely or partially in liquid state. In the latter case heat carried by the solid particles from the regenerating zone serve to substantially vaporize the liquid reactants.

The features and advantages of the invention will be more fully explained in conjunction with the following description of the accompanying diagrammatic drawing. The drawing is an elevational view of one specific form of apparatus embodying the feature of the invention and in which the improved process provided by the invention may be successfully conducted.

Referring to the drawing, the apparatus here illustrated comprises a vertically elongated substantially cylindrical reactor 1 having an inverted substantially conical lower head 2 and an upper head 3 in which is mounted suitable equipment, such as the cyclone separator indicated at 4, for separating suspended particles from the outgoing stream of vaporous and/or gaseous conversion products.

A bed 5 of subdivided solid catalyst or contact material is maintained within the reaction zone and is kept in a fluid-like state of relatively high density and high solid particle concentration by passing the fluid reactants to be converted and resulting fluid conversion products upwardly through the bed at a velocity which partially counteracts the force of gravity on the solid particles and brings about their hindered settling within the bed. A light phase 6 of materially reduced density and solid particle concentration is maintained above the fluid-like bed 5 in the upper portion of the reactor so that a major separation of solid particles from the outgoing fluid conversion products is effected within the bed or, more particularly, at the approximate upper extremity of the bed, which is indicated by the broken line 7.

The regenerator 8, in the case illustrated, comprises another similar vertically elongated substantially cylindrical vessel provided with an inverted substantially conical lower head 9 and an upper head 10 in which suitable solid particle separating equipment, such as the cyclone separator indicated at 11, is mounted.

A bed 12 of subdivided fluid catalyst or contact material undergoing regeneration is maintained within the regenerator and is kept in a fluid-like state of relatively high density and high solid particle concentration by passing oxidizing gas employed for burning combustibles from the solid particles and resulting combustion gases upwardly through the bed at a velocity which partially counteracts the force of gravity on the solid particles and brings about their hindered settling within the bed. A light phase 13 of materially reduced density and solid particle concentration is maintained within the regenerator above the fluid-like bed 12 so that a major separation of solid particles from the outgoing gaseous products of regeneration is effected within the bed or, more particularly, at the approximate upper extremity thereof, which is indicated by the broken line 14 of the drawing.

Conditions of temperature, pressure and space velocity suitable for effecting the desired conversion of the fluid reactants passing through bed 5 are maintained within the reaction zone. The fluid reactants are supplied in the case illustrated through line 15 and valve 15a to transfer line 16 wherein they commingle, as is later described, with a stream of hot regenerated contact material from the regenerator and the suspension is directed through line 16 into the lower portion of the reactor. The solid particles and reactants are substantially uniformly distributed over the cross section area of a cylindrical section of the reactor as they enter the latter by means of a perforate plate or other suitable distributing grid indicated at 17.

Fluid conversion products pass from the upper portion of bed 5 into the light phase 6 and are directed from the latter into separator 4, wherein all or a substantial portion of the relatively small quantity of catalyst particles remaining suspended in the fluid reactants is separated from the latter. The resulting separated solid particles are returned from the lower portion of separator 4 through standpipe 18 to the bed 5. The vaporous and/or gaseous conversion products are directed from the upper portion of the separator through line 19 and valve 20 preferably to suitable further separating and recovery equipment of any desired conventional form not pertinent to the present invention and therefore not illustrated.

Conditions of temperature, pressure and space velocity suitable for effecting regeneration of the solid particles transferred from the reactor to the regenerator are maintained in the latter zone. The oxidizing gas employed for burning combustible contaminants from the solid particles in bed 12 and thus effecting the regeneration is supplied in the case illustrated through line 21 and valve 22 to transfer line 23. In line 23 the oxidizing gas stream is commingled with contaminated solid particles withdrawn from the reactor as will be subsequently described and the suspension is directed through line 23 into the lower portion of the regenerator. The oxidizing gas and suspended solid particles are distributed substantially uniformly over the horizontal cross section of the cylindrical portion of the regenerator as they enter the latter by means of a perforate plate or other suitable distributing grid indicated at 24.

Gaseous products of the regeneration are directed from the relatively dense fluid-like bed 12 into the light phase 13 wherefrom they are supplied, with the relatively small amount of solid particles which remain suspended therein, into separator 11. In separator 11 all or a substantial portion of the remaining entrained solid particles are separated from the outgoing gaseous products of regeneration, and the separated solid particles are returned from the lower portion of the separator through standpipe 25 to the bed 12. The gaseous products of regeneration are directed from the upper portion of separator 11 through line 26 and valve 27 preferably to suitable equipment, such as a waste heat boiler, hot gas turbine or the like, not illustrated, for recovering useful energy stored as heat in these gaseous products.

The solid particles of the bed 5 in the reactor accumulate deleterious heavy products of the conversion reaction or reactions taking place in the reaction zone. These contaminants are combustible in the case of hydrocarbon conversion reactions, such as cracking, dehydrogenation, aromatization and the like and, in operations of the type to which the present invention is addressed, these heavy combustible contaminants are continuously removed by burning in the regenerating step to restore activity to the solid particles.

The solid particles of bed 5 also accumulate lighter volatiles or readily vaporizable reactants and conversion products which comprise, in the case of hydrocarbon conversion reactions, valuable normally gaseous and light liquid hydrocarbons which would be consumed by their combustion in the regenerating zone if left in the stream of solid particles transferred from the reactor to the regenerator. To effect their substantially complete removal from the stream of solid particles being transferred, in such a manner that they may be readily recovered, the stream of solid particles to be regenerated is directed, with the deposited heavy combustibles and with entrained and adsorbed volatile combustibles, preferably from a relatively high point in the fluid bed 5 adjacent its upper extremity through line 28 and the adjustable orifice or flow control valve 29 provided in this line into the upper portion of a separate stripping zone. The stripping zone comprises a tube or vertically elongated substantially cylindrical vessel indicated at 30. A region 31 is maintained within the stripping zone through which the solid particles from line 28 fall or rain downwardly in a substantially unobstructed path in a condition of low solid particle concentration relative to that prevailing in bed 5 and countercurrent to an ascending stream of stripping gas. The latter entrains volatiles occluded in the stream withdrawn from the reactor through line 28 and contacts the solid particles to remove volatile fractions adsorbed on the latter. By allowing the solid particles to rain freely downward in dispersed condition through a region in the stripping zone of relatively high stripping gas concentration and relatively low solid particle concentration, without material obstruction to their flow, by avoiding the use of baffles or the like, usually efficient and thorough stripping of the undesired volatile combustibles from the stream of solid particles is obtained.

The stripping gas employed in zone 30 may comprise steam, for example, or other suitable relatively inert gas. This material is supplied through line 32 and may be introduced all or in part into stripper 30 through line 33, valve 34 and a suitable distributing head, such as indicated for example at 36, at a relatively low point in this zone above the level, indicated at 37, of a relatively dense mass of the solid particles maintained in the lower portion of the stripper, or the stripping gas may be supplied all or in part through line 38 and valve 39 into stripper 30 beneath the level 37.

The stripping gas together with the volatile combustibles which are removed from the stream of solid particles in the stripping zone is withdrawn from the upper portion of the latter, preferably above the outlet end of line 28 and, in the particular case illustrated, is directed through line 40 into the light phase 6 maintained in the reactor, to commingle therein with the outgoing stream of fluid conversion products supplied to separator 4. Alternatively, line 40 may, when desired, communicate directly with separator 4.

By providing a stripping zone which is a separate tube or vessel disposed outside the reaction vessel, I obviate the necessity for passing the enriched stripping gas from this zone through any portion of the fluid-like bed within the reaction zone, thus avoiding re-entrainment or adsorption of the removed volatiles by their contact with the solid particles of the bed and also avoiding passage of the stripping gas through any portion of the bed. By commingling the enriched stripping gas with the outgoing fluid conversion products either prior to or within the cyclone separator or other solid particle separating equipment employed, entrained solid particles are separated from the stripping gas and the evolved volatiles may be recovered in the same separating equipment to which the fluid conversion products are supplied.

The degree of completion or extent to which volatile combustibles are removed from the stream of solid particles in the stripping zone depends not only upon the particular method of stripping employed but also upon the contact time afforded the solid particles and the stripping gas. With the arrangement herein provided the factor of contact time may be varied over a considerable range to suit requirements and obtain the degree of stripping desired. This is accomplished by controlling the location of the level 37 within the stripping zone. This level 37, which represents the upper extremity of the relatively dense column of downwardly moving solid particles carried in stripper 30, may be maintained at any required elevation in the latter ranging from its extreme lower portion to a point relatively close to but beneath the outlet end of line 28. The invention also provides a method, which will be later described, whereby this level may be automatically maintained at the desired elevation.

The solid particles are passed downwardly from the lower portion of the stripper through standpipe 41 as a relatively dense moving column or stream and are directed through an adjustable orifice or a flow control valve 42 provided adjacent the lower end of standpipe 41 into transfer line 23. In line 23 the solid particles contact and are dispersed in the incoming stream of oxidizing gas supplied, as previously described, through line 21 and valve 22 and are transported by the latter into the regenerator.

The transfer of solid particles from the fluid bed 12 in regenerator 8 to the reactor is effected through line 43, the adjustable orifice or flow control valve 44, stripper 30', standpipe 41', valve 42' and transfer line 16 in the same general manner, above described, as solid particles are transferred from the reactor to the regenerator, except that fluid reactants to be converted are utilized as the transporting medium in line 16. Stripper 30' is similar in form and arrangement to stripper 30 and functions in substantially the same manner to remove occluded and adsorbed oxidizing gas and gaseous products of regeneration from the stream of solid particles withdrawn from the fluid bed 12 through line 43. Portions of stripper 30' and the connecting lines and communicating equipment corresponding to those above described in conjunction with stripper 30 are indicated by corresponding prime numbers in the drawing.

To prevent excessive compaction of the solid particles in standpipe 41 and 41', which would prevent or hinder flow therethrough, suitable aerating gas, such as steam or other relatively inert gas is supplied to the standpipes on the up stream side of the flow control valves 42 and 42' to pass upwardly through the standpipe and keep the column of solid particles in a fluid condition but relatively compact, or of higher density than beds 5 and 12. Line 45 and valve 46 communicating with standpipe 41 and line 45' and valve 46' communicating with standpipe 41' are provided in the case illustrated for the introduction of aerating gas.

The transfer circuit thus comprises, in effect, a pair of U tubes each having one leg (standpipe 41 or 41') in which the column of solid particles is relatively heavy and dense due to a relatively high concentration of solid particles therein, while the column in the other leg (comprising transfer line 23 and the fluid bed 12, or transfer line 16 and the fluid bed 5) is relatively light due to the materially lower solid particle concentration and particularly the low concentration in transfer lines 16 and 23.

To obtain flow in the desired direction, it is necessary that the pseudo-hydrostatic pressure in the standpipe, adjacent and on the upstream side of the adjustable orifice or flow valve therein, is higher than that on its downstream side, and to maintain this condition the product of height times density of the column of solid particles in the standpipe, including any relatively dense bed of solid particles in the stripper up to the dense phase level in this zone, is greater than the product of height times density of the column of solid particles extending from the upper extremity of the fluid bed in the vessel to which the solid particles are supplied to a point in the transfer conduit communicating with this vessel beneath the flow control valve in the standpipe.

Of course, the gauge pressure prevailing in the free spaces of strippers will be effective on the columns of solid particles in the respective standpipes and the gauge pressure prevailing in the light phases above the fluid beds in the regenerator and reactor will be effective on the column of solid particles in the bed in the same zone and in transfer line through which solid particles are supplied thereto, and these pressures must be taken into consideration in balancing the transfer circuit to obtain flow between the vessels. To simplify explanation of the method of transfer employed it may be assumed that the gauge pressure in the light phase of reactor 30 is substantially the same as that in the light phase of regenerator 8 and that the gauge pressures in the free spaces 31 and 31' of the respective strippers 30 and 30' are substantially the same. However, it is entirely possible to operate the process with a higher gauge pressure in the light phase 6 of the reactor than that employed in the light phase 13 of the regenerator or vice versa, and to maintain a considerable differential pressure between the free spaces 31 and 31' of the respective strippers 30 and 30'. Flow may be accomplished under these conditions by extending the standpipe 41 or 41' (which ever communicates with the zone of lowest pressure on the upstream side of the flow control valve therein) to a suitable low elevation so that the pseudo-hydrostatic pressure at the lower end of this standpipe will somewhat more than equal the pseudo-hydrostatic pressure on the outlet side of the flow control valve therein. Alternatively the reactor vessel or the regenerator vessel (which ever employs the lower pressure) may be elevated in relation to the other vessel so as to suitably extend the height of the column in standpipe 41 or in standpipe 41' as the case may be.

As previously mentioned, the invention also provides a method and means for automatically maintaining the desired free spaces 31 and 31' in the respective strippers 30 and 30' or, stated in another way, keeping a substantially constant level 37 at any desired elevation in stripper 30 and a substantially constant level 37' at any desired elevation in stripper 30', which may be higher or lower, or the same as the level 37 in stripper 30. This is accomplished with respect to stripper 30 by means of a differential pressure control instrument 47, of any suitable conventional form which adjusts the opening through valve 29 in line 28 to control the flow of solid particles therethrough as will now be explained.

A line 48 connects the control instrument 47 with line 40 from stripper 30, or alternatively with any suitable relatively high point in the stripper above the desired level 37, and another line 49 connects the control instrument with standpipe 41, or alternatively with any suitable relatively low point in the stripper beneath level 37. Thus the instrument 47 receives an impulse which will vary in magnitude with the height of the relatively dense column of solid particles in standpipe 41 and stripper 30, which depends upon the elevation of the level 37, and the instrument functions to keep the magnitude of this impulse at the desired substantially constant value for which it is set by opening or closing valve 29 to admit more or less solid particles to the stripper and raise or lower the level 37 in response to minor changes in the magnitude of the impulse.

In the case illustrated, instrument 47 is of the air operation type and air for its operation is supplied thereto at a substantially constant pressure through line 50 and valve 51. Output air at a pressure varying in direct relation to the magnitude of the impulse received by the controller through lines 48 and 49 is transmitted from instrument 47 through line 52 to the diaphragm type flow control valve 29 which is indirect acting (i. e. the opening through the valve is decreased by an increasing pressure in line 52 and vice versa). Thus a receding level 37 in stripper 30 is accompanied by a reduction in the pressure transmitted to instrument 47 through line 49, and since the pressure in line 48 remains the same, the impulse received by instrument 47, corresponding to the differential pressure in lines 48 and 49, is reduced and the instrument functions to open valve 29, admit more solid particles to the stripper and bring level 37 back to the desired elevation. With an increasing level in stripper 30 the instrument works in the opposite way to reduce the opening through valve 29 and bring the level back to the desired elevation.

The corresponding control instrument 47' connected with stripper 30' functions in the same general manner, above described, as instrument 47 and operates to adjust the opening through valve 44 in line 43 in response and in inverse relation to minor changes in the location of the dense phase level 37' in stripper 30'. Lines connected with instrument 47' which correspond to those connected with instrument 47 are indicated by corresponding prime numbers in the drawing.

With the method of automatic control illustrated and above described or with an equivalent method the height of the column of solid particles in each of the standpipes 41 and 41' is maintained substantially constant regardless of the rate at which solid particles are circulated between and through the reaction and regenerating zones. With oxidizing gas supplied to transfer line 22 at a substantially constant rate and fluid reactants supplied to transfer line 16 at a substantially constant rate, the circulation rate of the solid particles is regulated to suit requirements by adjustment of the flow control valves 42 and 42' in the respective standpipes 41 and 41'. This may be done without materially changing the pseudo-hydrostatic pressure on the upstream side of the flow control valves, since the operating pressure maintained in the light phase of the reactor and that maintained in the light phase of the regenerator are held substantially constant by suitable well-known means not illustrated, and the height and density of the columns of solid particles in standpipes 41 and 41' remain substantially constant.

It is, of course, also within the scope of the invention to employ control instruments of any other suitable well-known form in place of the air operated instruments 47 and 47' or, when desired, valves 29 and 44 may be manually operated, preferably by remote control.

The invention is not limited to the use of the method and means of stripping disclosed for both streams of catalysts (i. e. that withdrawn from the reactor and transferred to the regenerator and that withdrawn from the regenerator and transferred to the reactor) since its use on only one of these streams will be advantageous and it may not be necessary in all instances to perform as thorough and efficient stripping on one of the streams. When only one stripper of the type provided is employed, the standpipe for supplying the other stream to the transfer line to which it is supplied may communicate directly at its upper end with the fluid-like bed in the vessel from which it is withdrawn, rather than with another stripper, and partial stripping may be accomplished in this standpipe by using a sufficient quantity of aerating gas supplied at one or a plurality of points in the standpipe on the upstream side of the flow control valve therein.

I claim as my invention:

1. In a process wherein a bed of subdivided solid contact material is maintained in each of a plurality of confined zones between and through which it is continuously circulated and in at least one of which it accumulates volatile fluid undesirable for transmission with the solid particles to the other confined zone, the improved method of substantially purging the stream of solid particles being transferred from the one confined zone to the other of said undesirable volatile fluid and effecting the transfer of said stream to the other zone, which method comprises directing a stream of the solid particles and accumulated undesirable fluid from a point below the upper extremity of the bed in the one zone into a separate stripping zone, causing the solid particles of said stream to fall downwardly through a free space in said stripping zone countercurrent to an ascending stream of stripping fluid, maintaining in said free space a substantially lower solid particle concentration than prevails in said bed in the one zone, removing the stripping fluid from said stripping zone, together with undesirable fluid thus removed from said stream, and preventing further passage of said undesirable fluid through any of said beds, collecting the thus purged solid particles and passing them downwardly in the form of a relatively dense column into a stream of transporting fluid, suspending the solid particles in said transporting fluid and directing the suspension into said other confined zone, and maintaining the height of said relatively dense column substantially constant by controlling the rate at which solid particles are supplied from said bed into the stripping zone in response and in inverse relation to minor variations in the height of said column.

2. In the process of converting fluid reactants wherein a bed of subdivided solid contact material is maintained in a confined reaction zone and said reactants are passed upwardly into the bed under conditions regulated to keep the latter in a relatively dense fluid-like state and effect the conversion reaction, said reaction being accompanied by the accumulation of contaminating volatile and non-volatile combustible products by the solid particles of the bed, and wherein contaminated solid particles are transferred from the reaction zone to a separate confined combustion zone in which combustibles are burned therefrom, the improved method of substantially purging the solid particles passing from the reaction zone to the combustion zone of volatile combustibles and effecting said transfer which comprises withdrawing a stream of the solid particles from a point of said bed beneath its upper extremity and supplying said stream to a confined stripping zone, causing the solid particles of said stream to fall downwardly through a free space provided in the stripping zone countercurrent to an ascending stream of stripping fluid supplied thereto, maintaining in said free space a substantially lower solid particle concentration than prevails in said bed, removing the resulting mixture of stripping fluid and stripped-out volatile combustibles from the stripping zone without permitting its passage either through the bed in the reaction zone or into the regenerating zone, passing the purged solid particles downwardly from the lower portion of the stripping zone in the form of a relatively dense column into a stream of oxidizing gas and directing the resulting suspension of solid particles in the oxidizing gas stream into said combustion zone, and maintaining the height of said relatively dense column substantially constant by controlling the rate at which solid particles are supplied from said bed into the stripping zone in response and in inverse relation to minor variations in the height of said column.

3. In a process wherein a bed of subdivided solid contact material which has accumulated combustion contaminants is maintained in a confined combustion zone and combustibles are burned therefrom by contact with oxidizing gas which is passed upwardly into said bed under conditions regulated to maintain the latter in a relatively dense fluid-like state, said burning being accompanied by the accumulation of combustion gases by the solid particles of said bed, and wherein resulting hot particles are transferred from said combustion zone to a separate confined reaction zone wherein they are contacted with fluid reactants to effect conversion of the latter, the improved method of substantially purging the solid particles passing from the combustion zone to the reaction zone of combustion gases and effecting said transfer which comprises withdrawing a stream of the solid particles from a point in the combustion zone beneath the upper extremity of said bed and supplying said stream to a confined stripping zone, causing the solid particles of said stream to fall downwardly through a free space provided in the stripping zone countercurrent to an ascending stream of stripping fluid supplied thereto, maintaining in said free space a substantially lower solid particle concentration than prevails in said bed, removing the resulting mixture of stripping fluid and stripped-out combustion gases from the stripping zone without permitting it to pass either through the bed in the combustion zone or into said reaction zone, passing the purged solid particles from the lower portion of said stripping zone downwardly in the form of a relatively dense column into a stream of said fluid reactants to be converted, directing the resulting suspension of solid particles in the reactant stream into said reaction zone, and maintaining the height of said relatively dense column substantially constant by controlling the rate at which solid particles are supplied from said bed into the stripping zone in response and in inverse relation to minor variations in the height of said column.

4. A process such as defined in claim 2 wherein said fluid reactants comprise hydrocarbons and the subdivided solid contact material comprises a hydrocarbon conversion catalyst.

5. A process such as defined in claim 2 wherein said fluid reactants comprise hydrocarbon oil to be catalytically cracked and wherein the subdivided solid contact material comprises a cracking catalyst.

6. In the process of converting fluid hydrocarbons wherein a bed of subdivided solid catalyst is maintained in a confined reaction zone and hydrocarbon reactants are passed upwardly into said bed under conditions regulated to keep the latter in a relatively dense fluid-like state and effect the conversion reaction, said reaction being accompanied by the accumulation of contaminating volatile and non-volatile combustible products by the solid particles of said bed, and wherein contaminated solid particles are transferred from the reaction zone to a separate confined combustion zone in which combustibles are burned therefrom, resulting hot regenerated solid particles being returned from the combustion zone to the bed in the reaction zone, the improved method of substantially purging the solid particles passing from the reaction zone to the combustion zone of volatile combustibles, which method comprises withdrawing a stream of the solid particles from a point in the reaction zone beneath the upper extremity of the fluid-like bed therein and introducing the same to a stripping zone, passing the solid particles of said stream downwardly through the stripping zone in countercurrent contact with an ascending stream of stripping fluid, removing the resulting mixture of stripping fluid and stripped-out volatiles from the stripping zone, removing the purged solid particles from the stripping zone in the form of a downwardly moving relatively dense column, introducing the withdrawn purged particles to the combustion zone, and maintaining the height of said relatively dense column substantially constant by controlling the rate at which solid particles are supplied from said bed into the stripping zone in response and in inverse relation to minor variations in the height of said column.

JERRY McAFEE.

REFERENCES CITED

The following references are of record in the file of this patent:

UNITED STATES PATENTS

| Number | Name | Date |
|---|---|---|
| 2,271,148 | Becker et al. | Jan. 27, 1942 |
| 2,337,684 | Scheineman | Dec. 28, 1943 |
| 2,341,193 | Scheineman | Feb. 8, 1944 |
| 2,326,705 | Thiele, et al. | Nov. 28, 1940 |
| 2,353,505 | Scheineman | July 11, 1944 |
| 2,367,694 | Snuggs | Jan. 23, 1945 |
| 2,326,703 | Thiele, et al. | Aug. 10, 1943 |
| 2,327,175 | Conn | Aug. 17, 1943 |

FOREIGN PATENTS

| Number | Country | Date |
|---|---|---|
| 540,309 | Great Britain | Oct. 13, 1941 |